United States Patent
Hubert et al.

(10) Patent No.: US 10,406,783 B2
(45) Date of Patent: *Sep. 10, 2019

(54) LAMINATED GLAZING

(71) Applicant: AGC GLASS EUROPE, Louvain-La-Neuve (BE)

(72) Inventors: Renaud Hubert, Landenne (BE); Yannick Sartenaer, Vedrin (BE); Francois Boland, Gemboux (BE); Thomas Lambricht, Perwez (BE); Benoit Domercq, Jumet (BE); Audrey Dogimont, Sart-Dames-Avelines (BE); Tanguy Timmermans, Brussels (BE)

(73) Assignee: AGC GLASS EUROPE, Louvain-La-Neuve (BE)

( * ) Notice: Subject to any disclaimer, the term of this patent is extended or adjusted under 35 U.S.C. 154(b) by 72 days.

This patent is subject to a terminal disclaimer.

(21) Appl. No.: 15/737,463

(22) PCT Filed: Jun. 6, 2016

(86) PCT No.: PCT/EP2016/062743
§ 371 (c)(1),
(2) Date: Dec. 18, 2017

(87) PCT Pub. No.: WO2016/202617
PCT Pub. Date: Dec. 22, 2016

(65) Prior Publication Data
US 2018/0170013 A1 Jun. 21, 2018

(30) Foreign Application Priority Data
Jun. 19, 2015 (EP) .................................... 15172969

(51) Int. Cl.
*B32B 15/04* (2006.01)
*B32B 17/06* (2006.01)
(Continued)

(52) U.S. Cl.
CPC .. *B32B 17/10513* (2013.01); *B32B 17/10036* (2013.01); *B32B 17/10119* (2013.01);
(Continued)

(58) Field of Classification Search
USPC ......................... 428/426, 428, 432, 434, 688
See application file for complete search history.

(56) References Cited

U.S. PATENT DOCUMENTS

| 4,338,000 A | 7/1982 | Kamimori et al. |
| 4,749,261 A | 6/1988 | McLaughlin et al. |

(Continued)

FOREIGN PATENT DOCUMENTS

| EP | 0 825 478 A1 | 2/1998 |
| FR | 2 874 607 A1 | 3/2006 |

(Continued)

OTHER PUBLICATIONS

International Search Report dated Aug. 10, 2016, in PCT/EP2016/062743 filed Jun. 6, 2016.

*Primary Examiner* — Lauren R Colgan
(74) *Attorney, Agent, or Firm* — Oblon, McClelland, Maier & Neustadt, L.L.P.

(57) ABSTRACT

A laminated glazing includes (i) a first outer sheet of glass; (ii) an electrically powered functional film; (iii) an infrared reflecting means arranged between the first sheet of glass and the functional film; (iv) at least one first thermoplastic insert arranged between the infrared radiation reflecting means and the functional film; and (v) a second outer sheet of glass. The laminated glazing includes at least the first outer sheet with infrared reflection RIRV so that RIRV≥1.087*TLV, where TLV is the light transmission of the sheet of glass, and the infrared reflecting means is characterized by light transmission TLC so that
(Continued)

TLC≥1.3*TIRC, where TIRC is the infrared transmission of the infrared radiation reflecting means.

17 Claims, 1 Drawing Sheet

(51) Int. Cl.
| | |
|---|---|
| B32B 17/10 | (2006.01) |
| B60J 3/00 | (2006.01) |
| C03C 3/087 | (2006.01) |
| E06B 3/67 | (2006.01) |
| E06B 9/24 | (2006.01) |
| G02F 1/1335 | (2006.01) |
| G02F 1/157 | (2006.01) |
| G02F 1/17 | (2019.01) |

(52) U.S. Cl.
CPC .. *B32B 17/10201* (2013.01); *B32B 17/10229* (2013.01); *B32B 17/10504* (2013.01); *B32B 17/10532* (2013.01); *B32B 17/10761* (2013.01); *B32B 17/10788* (2013.01); *B60J 3/007* (2013.01); *C03C 3/087* (2013.01); *E06B 3/6722* (2013.01); *E06B 9/24* (2013.01); *G02F 1/133553* (2013.01); *G02F 1/157* (2013.01); *G02F 1/172* (2013.01); *B32B 2255/20* (2013.01); *B32B 2255/205* (2013.01); *B32B 2307/412* (2013.01); *B32B 2307/416* (2013.01); *B32B 2419/06* (2013.01); *B32B 2605/006* (2013.01); *E06B 2009/2464* (2013.01); *G02F 2203/11* (2013.01)

(56) References Cited

U.S. PATENT DOCUMENTS

| | | | |
|---|---|---|---|
| 6,055,088 A | 4/2000 | Fix et al. | |
| 6,466,298 B1 | 10/2002 | Fix et al. | |
| 6,998,362 B2 * | 2/2006 | Higby | C03C 1/00 501/71 |
| 9,434,635 B2 * | 9/2016 | Horsley | C03C 3/087 |
| 2004/0110625 A1 * | 6/2004 | Smith | C03B 5/2353 501/72 |
| 2005/0148453 A1 * | 7/2005 | Coster | C03C 3/095 501/64 |
| 2007/0191205 A1 * | 8/2007 | Delmotte | C03C 3/087 501/55 |
| 2007/0213196 A1 * | 9/2007 | Jones | C03C 1/00 501/70 |
| 2007/0243993 A1 * | 10/2007 | Heithoff | C03C 3/087 501/71 |
| 2009/0046355 A1 | 2/2009 | Derda | |
| 2009/0135319 A1 | 5/2009 | Veerasamy | |
| 2009/0176101 A1 | 7/2009 | Greenall et al. | |
| 2009/0233121 A1 | 9/2009 | Leconte | |
| 2009/0279004 A1 | 11/2009 | Greenall et al. | |
| 2010/0165436 A1 | 7/2010 | Voss et al. | |
| 2012/0058879 A1 * | 3/2012 | Kim | C03C 4/02 501/64 |
| 2012/0293862 A1 | 11/2012 | Veerasamy | |
| 2012/0307337 A1 | 12/2012 | Bartug et al. | |
| 2014/0017500 A1 * | 1/2014 | Koike | C03C 3/085 428/410 |
| 2014/0249014 A1 * | 9/2014 | Lee | C03C 3/087 501/11 |
| 2015/0165728 A1 | 6/2015 | Legrand et al. | |
| 2015/0344354 A1 * | 12/2015 | Cho | C03C 4/02 252/587 |
| 2016/0152511 A1 * | 6/2016 | Lambricht | C03C 3/091 359/351 |
| 2018/0194667 A1 * | 7/2018 | Lambricht | C03C 3/087 |

FOREIGN PATENT DOCUMENTS

| | | |
|---|---|---|
| GB | 2 445 841 A | 7/2008 |
| WO | 2012/095380 A1 | 7/2012 |
| WO | 2013/189798 A1 | 12/2013 |
| WO | 2014/135467 A1 | 9/2014 |

* cited by examiner

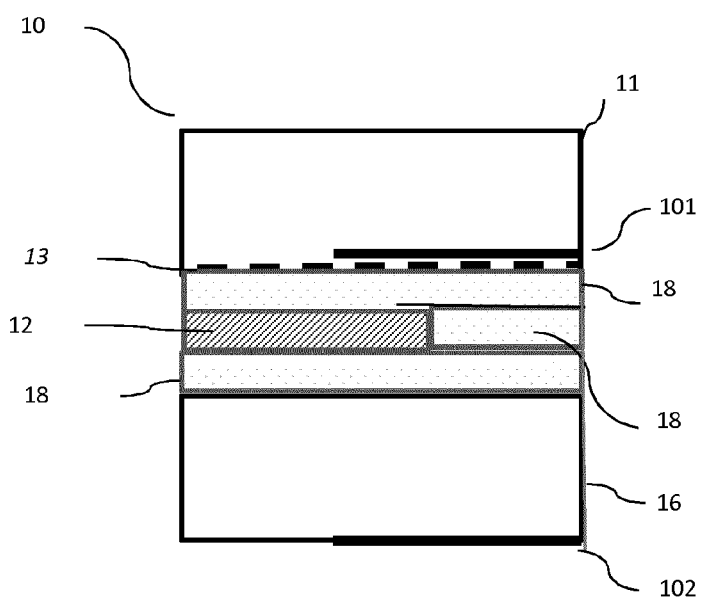

LAMINATED GLAZING

The present invention relates to a laminated glazing, in particular a laminated glazing intended to be used as a dynamic glazing.

The invention is primarily intended to be applied to automotive glazings, but it also relates to other kinds of glazings and generally to any glazing comprising a functional film, in particular when said glazing is subject, during its manufacture or its use, to constraints, in particular in terms of heat treatments. For example, in the architectural field such glazings are dynamic glazings that may be darkened at will, in particular electronically, in order to protect against the heat of the sun and glare. In the construction field, smart windows as they are called are composed of a layer that is electro chromic, photochromic, thermochromic, etc. sandwiched between two transparent electrodes, then two glass sheets. Controlled electrically, these windows can be darkened at will when the weather is sunny in order to prevent the passage of light into a room, or lightened when the weather is cloudy in order to once more maximize the passage of light. However, in this type of application, it is highly recommended to temper the glass sheets in order to ensure the glass does not break following a thermal shock, particularly when the functional film used is a highly absorbent film such as an electrochromic film, a photochromic film, a thermochromic film, etc.

In the automotive field, such glazings are for example used as the roofs, windshields, rear windshields and side windows of vehicles. In particular, glazed roofs are increasingly being substituted for conventional roofs, which form part of the body of vehicles. As in the architectural field, the choice of these roofs is the result of constructors offering to their customers this option, which makes a vehicle seem to open onto the exterior, like a convertible, without the disadvantages of convertibles, as these roofs maintain the comfort levels of a conventional sedan. To do so, glazed roofs must satisfy many requirements.

Just as for dynamic glazings in the architectural field, the aim of the choice of glazed roofs is in particular to increase light level in the roofed space i.e. here a passenger compartment. This increase must not be obtained at the expense of other properties which ensure the comfort of passengers or building occupants, in particular thermal comfort and acoustic comfort. The latter is maintained, indeed even improved, by the presence of the laminated structure, in particular when the latter comprises interlayers chosen for their ability to dampen vibrations, as in particular employed in windshield glazings.

The presence of glazed roofs or dynamic glazings, which is motivated by the increase in light level, results in the increase in heat exchange with the exterior. This is appreciable in the greenhouse-effect mechanism when the vehicle or the building is exposed to intense solar radiation, but also in the loses of the heat from the passenger compartment or building in cold periods.

The desire to control thermal conditions leads to various measures, including the use of high-selectivity glazings. These conditions result from the choice of the glasses used (most often mineral glasses, but also possibly organic glasses). They are also the result of the additional filters which these glazings comprise, in particular those consisting of systems of layers mainly reflecting the infrared. Solutions meeting these requirements are known from the prior art. This is the case in particular of the patent EP 1 200 256.

Moreover, the desire to increase light level in the passenger compartment or building is not necessarily always present. The user may, depending on the moment, prefer a lower light level, or simply want to maintain his privacy.

Solutions for modifying the light transmission of glazings depending on the conditions of use have already been proposed. It is a question in particular of the glazings referred to as "electrically controlled" glazings, such as glazings comprising functional films such as electrochromic means in which the variation is obtained by modifying the state of colored ions in compositions included in these glazings. It is also a question of glazings comprising, in suspension, layers of particles that, depending on the application of an electric voltage, are or are not ordered, such as the systems referred to as suspended particles devices (SPDs), or even a polymer-dispersed liquid-crystal (PDLC) film consisting of a polymer containing liquid crystals sensitive to the application of the electric voltage.

In particular, although these functional films allow the light level in the passenger compartment or building to be modified, their function is also to modify the antiglare effect and the level of privacy. Another role of these films is to protect the interior of the passenger compartment or building from heat. In particular, these functional films are films that are switchable between a dark state and a translucent or even transparent state, or that are even capable of providing a lighting function for lighting the interior of a vehicle or building in which the glazing is fitted.

In the prior art, the use of liquid crystal films in glazings has been envisaged as a way of forming partitions providing controllable visual isolation. In these applications, the main function is the transformation of an essentially transparent glazing into a glazing that is simply translucent. These applications did not involve specific thermal characteristics. Likewise, the light transmission was not key.

Examples of glazings comprising an SPD film are also known in the literature. Such glazings are, for example, described in the documents WO2005/102688 and DE 100 43 141. The film is switchable between a dark state (in the absence of applied voltage) and a highly transparent state (when a voltage is applied).

Generally, whether the functional film is an SPD film or a polymer-dispersed liquid-crystal (PDLC) film or a film comprising light-emitting diodes or even electrochromic, photochromic or thermochromic, it is laminated in a laminated glazing structure by virtue of at least one thermoplastic interlayer. This is for example described in the document US2004/0257649.

Such laminated glazings, which, due to the inclusion of a polymer-dispersed liquid-crystal (PDLC) film or an SPD film or an electrochromic film, have light-transmission properties that may be varied, are increasingly sought after because of the improvement in building-occupant or passenger comfort. Specifically, once fitted in a vehicle or building, this glazing provided with such a film allows the temperature in the passenger compartment of the vehicle or the building to be lowered but also allows the light level desired for the interior of the vehicle or building to be selected.

Unfortunately, these functional films, when they are incorporated into a laminated glazing, deteriorate as a result of their sensitivity to high temperatures, to such an extent that the performance of each is affected.

Generally, in the preparation of such laminated glazings according to the invention, and in particular vehicle roofs, it is advisable to consider the ability of the constituent elements to withstand the treatments that are used to shape and assemble the glazing. In practice, functional films such as, inter alia, SPD films or even PDLC films, are sensitive to temperature rises. Above 70° C., they are generally no longer controlled by the variations in electric fields. When the functional film is subjected to a prolonged exposure to heat, in particular to temperatures greater than 70° C., and more particularly greater than 80° C., the functional film (PDLC film, SPD film, etc.) may be damaged (degradation of the film and for example of the switching function).

A prolonged exposure to such temperatures in particular results from the application of an electric field for activating the film and/or from heat originating from the external sheet (direct transmission or re-emission of heat following excessive level of absorption) and/or from solar radiation or even the enamel layer in the case of a vehicle.

Thus, the functional film, when it is incorporated into a laminated glazing and positioned on a vehicle, in particular as glazed roof, or in a building, advantageously has to withstand high temperatures which can reach temperatures of greater than 85° C. Above this temperature, and for prolonged exposure, the functional film deteriorates. This temperature is in particular reached when the functional film is in the active position (ON position). Thus, the functional film, when it is incorporated in a multiple glazing, has to be protected from the rises in temperatures.

Thus, the invention relates to any laminated glazing, whether tempered or not, that comprises a functional film that is sensitive to heat.

In the present document, unless otherwise indicated, the following terms are used in accordance with the following definitions:

TL=light transmission=percentage of the incident light flux transmitted by a product (between 380 and 780 nm) with illuminant C and a 2° observer.

$TL_V$=light transmission of the glass sheet=percentage of the incident light flux transmitted by the glass substrate (between 380 and 780 nm) with illuminant C and a 2° observer. It is here defined for a glass of 4 mm thickness.

$TL_C$=light transmission of the infrared-reflecting means and in particular of the layer=percentage of the incident light flux transmitted by a product consisting of the layer deposited on a glass sheet having a zero absorption (between 380 and 780 nm) with illuminant C and a 2° observer.

RL=light reflection=percentage of the incident light flux reflected by a product (between 380 and 780 nm) with illuminant C and a 2° observer.

SF=g=solar factor=the percentage of incident energy radiation that is directly transmitted by the product, on the one hand, and absorbed by this, then radiated by its face opposite to the energy source, on the other hand, calculated according to standard ISO9050: 2003.

S=select=selectivity=the ratio of the light transmission to the solar factor.

TIR=infrared transmission=percentage of the infrared radiation transmitted (between 780 and 2500 nm) by a product, calculated according to standard ISO 9050: 2003.

$TIR_C$=infrared transmission of the infrared-reflecting means and in particular the layer=percentage of the infrared radiation transmitted (between 780 and 2500 nm) by a product consisting of the layer deposited on a substrate having a zero absorption, and calculated according to standard ISO9050: 2003.

RIR: infrared reflection=percentage of the infrared radiation reflected (between 780 and 2500 nm) by a product, calculated according to standard ISO 9050: 2003.

$RIR_V$=infrared reflection of the glass sheet with an ideal reflector=percentage of the infrared radiation reflected (between 780 nm and 2500 nm) for the glass substrate bearing an ideal layer reflecting 100% in the infrared. It is here defined for a glass sheet of 4 mm thickness. The layer being deposited on the face opposite the incident radiation, calculated according to standard ISO 9050: 2003. The maximum $RIR_V$ value of 100% is reached when there is no absorption in the glass, and $RIR_V$ decreases as the absorption in the glass increases, along the optical path amounting to 2*4 mm (round-trip)=8 mm.

$RIR_C$=infrared reflection of the infrared-reflecting means and in particular of the layer=percentage of the infrared radiation reflected (between 780 and 2500 nm) by a product consisting of the layer deposited on a substrate having a zero absorption, calculated according to standard ISO9050: 2003.

AIR: infrared absorption=percentage of the infrared radiation absorbed (between 780 and 2500 nm) by a product, calculated according to standard ISO 9050: 2003.

$AIR_C$=infrared reflection of the layer=percentage of the infrared radiation absorbed (between 780 and 2500 nm) for the product comprising the layer deposited on a substrate having a zero absorption, calculated according to standard ISO9050: 2003.

For simplicity, the numbering of the glass sheets in the continuation of the description refers to the numbering nomenclature conventionally used for glazings. Thus, the face of the laminated glass which is in contact with the environment external to the vehicle is known as being the face 1 and the surface in contact with the internal medium, that is to say the passenger compartment of the vehicle, is known as face 4, the functional film being positioned between the faces 2 and 3, where it can be protected from damage.

In order to avoid any doubt, the terms "external" and "internal" refer to the orientation of the glazing during the installation as glazing in a vehicle or a building.

To prevent the problem of heating of the glazing and therefore consequently the functional film, an external first glass sheet that is clear or extra-clear is conventionally used in combination with an infrared-reflecting means.

Moreover, for certain applications, it is desirable to use colored glasses that are tinted in their bulk in order to guarantee privacy is maintained but above all a limited exterior-face light reflection and to decrease the angular dependency of the color in reflection in particular due to the presence of an infrared-reflecting means (which also has an impact on the reflection in the visible domain).

Unfortunately, at the present time, no solution has been proposed for solving these two problems simultaneously.

Thus, the invention proposes a laminated glazing comprising:
  a. an external first glass sheet,
  b. an electrically powered functional film,
  c. a means for reflecting infrared radiation placed between the first glass sheet and the functional film,
  d. at least one first thermoplastic interlayer placed between the means for reflecting infrared radiation and the functional film,
  e. an internal second glass sheet.

According to the invention, at least the first sheet comprised in the laminated glazing has an infrared reflection $RIR_V$ such that $RIR_V \geq 1.087 * TL_V$, $TL_V$ being the light transmission of the glass, and in that the infrared-reflecting means is characterized by a light transmission $TL_C$ such that $TL_C \geq 1.3 * TIR_C$, $TIR_C$ being the infrared transmission of the means for reflecting infrared radiation.

The inventors have surprisingly shown that the use of a glazing according to the invention, allows an energy absorption lower than that of a laminated glazing of the prior art having a similar TL to be obtained. This decrease in energy absorption allows the heating of the glazing during the exposure to the sun to be decreased and therefore the longevity of the functional film to be increased.

The glazing according to the invention also allows a colored glass sheet having a sought-after esthetic (and allowing inter alia privacy and the decrease in light reflection to be guaranteed), while guaranteeing a sufficiently low energy absorption to prevent harmful heating of the functional film. Thus, one of the main advantages of the present invention is that the means for reflecting infrared radiation reflects a high proportion of solar energy before reaching the functional film where it could be absorbed. In addition, the glass sheet comprising the infrared-reflecting means according to the invention itself being less absorbent than a glass sheet comprising the infrared-reflecting means not according to the invention, the amount of heat reemitted toward the functional film is decreased thereby. By virtue of the invention, the total amount of heat absorbed by the functional film will be lower and the longevity of the latter will be increased.

According to the invention, when the glazing is mounted on a motor-vehicle passenger compartment or a building, the first glass sheet, which comprises an infrared-reflecting means on face 2, is placed on the exterior side of the vehicle or building.

In addition, surprisingly, the inventors have shown that the use of at least one glass sheet combined with an infrared-reflecting means according to the invention, in a glazing comprising a functional film allows the need to temper the glass sheet to be decreased. Specifically, when a glazing not according to the invention is exposed to solar radiation, it will absorb energy and thus get hotter. Generally, the laminated glazing comprising a functional film is held in a frame whether this be by the passenger compartment of the vehicle, when the glazing is mounted on a vehicle, or on a holder, for example a jamb, in the architectural field. Thus, because of the presence of this "frame" or solutions for masking connecting elements of the functional film, or even the presence of one or more elements partially shadowing the glazing, the latter will not be heated identically over the entire area of the glazing. This in particular results in irregular expansion of the glazing. This is particularly true for the portion of the glazing comprised in the interior of the frame (not exposed to the solar radiation.). Therefore, the hottest portions will be compressed whereas the coldest portions will be subject to a tensile stress. Glass is not very resistant to tensile stresses, in particular on its edge where there is conventionally a high concentration of cracks and defects caused by handling and transportation. If the mechanical stress that results exceeds the acceptable tensile stress the glass will break. This phenomenon is called "thermal breakage". To prevent the glazing not according to the invention from breaking in such a situation, the glass is generally thermally or chemically tempered in order to increase its mechanical strength and in practice make thermal breakage impossible, even under severe climatic conditions.

By virtue of the invention, the total amount of heat absorbed by the functional film will be lower. Therefore, even in case of highly unequal solar irradiation, the temperature gradient between the hot portion and the cold portion of the glazing will be sufficiently low to prevent the risk of thermal breakage and the need for a temper. The fact of being able to eliminate the step of tempering a glass sheet is particularly advantageous since it is then possible to work with glass sheets of large sizes which may be cut to the desired dimensions in the last step in the assembly process thus leading to greater flexibility and substantial decreases in manufacturing costs.

Very selective glazings according to the invention are very advantageous because they allow the needs in terms of artificial lighting and cooling in the interior of the vehicle or building to be decreased, while retaining a view of the exterior. Laminated glazings comprising a functional film are generally used to improve interior thermal comfort and to decrease the need for cooling. Thus, by virtue of the invention, the duration of use for example of air-conditioning may be decreased while decreasing the need for artificial lighting. Thus, the laminated glazing according to the invention has advantages both from an energy point of view (decrease in the need for cooling) and from a point of view of well-being (increase in the amount of natural light available in the interior of the vehicle or building).

Another aim of the invention is to provide a means for protecting a functional film against heat and excessive heating, when the latter is integrated into a laminated glazing.

Preferably, at least the first glass sheet has an infrared reflection $RIR_V$ such that $RIR_V \geq 1.087 * TL_V + 5$.

Preferably, at least the first glass sheet has an infrared reflection $RIR_V$ such that $RIR_V \geq 0.510 * TL_V + 53$.

According to the invention, at least the first glass sheet is made of glass possibly belonging to various categories. The glass can thus be a glass of soda-lime-silica, aluminosilicate or borosilicate type, and the like. Preferably, the base composition of the glass according to the invention comprises, in a content expressed in percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

More preferably, the base composition of the glass according to the invention comprises, in a content expressed in percentages by total weight of glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5%. |

Most preferably and for reasons of lower production costs, at least the first glass sheet according to the invention is made of soda-lime-silica glass. Advantageously, according to this embodiment, the base composition of the glass comprises, in a content expressed in percentages by total weight of glass:

| | |
|---|---|
| SiO₂ | 60-75% |
| Al₂O₃ | 0-6% |
| B₂O₃ | 0-4% |
| CaO | 0-15% |
| MgO | 0-10% |
| Na₂O | 5-20% |
| K₂O | 0-10% |
| BaO | 0-5%. |

In addition to its base composition, the glass may comprise other components, of nature and quantity tailored to the sought-after effect.

One solution proposed in the invention for obtaining a glass with a very high reflection in the infrared $RIR_v$ consists in using in the composition of the glass chromium, in a range of specific contents.

Thus, according to a first embodiment, at least the external first glass sheet advantageously has a composition that comprises, in a content expressed in percentages by total weight of glass:

| | |
|---|---|
| Total iron (expressed in the form of Fe₂O₃) | 0.002-0.06%; |
| Cr₂O₃ | 0.0001-0.06%. |

Such glass compositions combining a low iron and chromium content have demonstrated a particularly good performance in terms of infrared reflection $RIR_v$ and exhibit a high transparency in the visible and a not very pronounced tint, close to a what is called "extra-clear" glass. These compositions are described in international patent applications WO2014128016A1, WO2014180679A1, WO2015011040A1, WO2015011041A1, WO2015011042A1, WO2015011043A1 and WO2015011044A1, which are incorporated by reference into the present patent application. According to this first particular embodiment, the composition preferably comprises a chromium (expressed in the form of Cr₂O₃) content ranging from 0.002% to 0.06% by weight with respect to the total weight of the glass. Such chromium contents allow the infrared reflection $RIR_v$ to be further improved.

According to a second embodiment, at least the external first glass sheet has a composition that comprises, in a content expressed in percentages by total weight of glass:

| | |
|---|---|
| Total iron (expressed in the form of Fe₂O₃) | 0.002-0.06%; |
| Cr₂O₃ | 0.0015-1%; |
| Co | 0.0001-1%. |

Such glass compositions based on chromium and cobalt have demonstrated a particularly good performance in terms of infrared reflection $RIR_v$, while offering advantageous possibilities in terms of esthetics/color (bluish neutrality to an intense hue or even up to opacity). Such compositions are described in European patent application no. 13 198 454.4, which is incorporated by reference into the present application.

According to a third embodiment, at least the external first glass sheet has a composition that comprises, in a content expressed in percentages by total weight of glass:

| | |
|---|---|
| Total iron (expressed in the form of Fe₂O₃) | 0.02-1%; |
| Cr₂O₃ | 0.002-0.5%; |
| Co | 0.0001-0.5%. |

Preferably, according to this embodiment, the composition comprises: 0.06%<total iron≤1%.

Such compositions based on chromium and cobalt allow colored glass sheets to be obtained in the blue-green range, which are comparable in terms of color and light transmission to commercially available blue and green glasses, but with a particularly good performance in terms of infrared reflection. Such compositions are described in European patent application EP15172780.7, which is incorporated by reference into the present patent application.

According to a fourth embodiment, at least first the external glass sheet has a composition that comprises, in a content expressed in percentages by total weight of glass:

| | |
|---|---|
| Total iron (expressed in the form of Fe₂O₃) | 0.002-1%; |
| Cr₂O₃ | 0.001-0.5%; |
| Co | 0.0001-0.5%; |
| Se | 0.0003-0.5%. |

Such glass compositions based on chromium, cobalt and selenium have demonstrated a particularly good performance in terms of infrared reflection, while offering advantageous possibilities in terms of esthetics/color (gray neutrality to a slight to intense hue in the gray-bronze range). Such compositions are described in European patent application EP15172779.9, which is incorporated by reference into the present patent application.

Alternatively to chromium, other solutions using one or more components in specific contents to obtain a glass with a very high infrared reflection $RIR_v$ are also proposed according to the invention.

According to an alternative first embodiment, at least the external first glass sheet has a composition that comprises, in a content expressed in percentages by total weight of glass:

| | |
|---|---|
| Total iron (expressed in the form of Fe₂O₃) | 0.002-0.06%; |
| CeO₂ | 0.001-1%. |

Such compositions are described in European patent application no. 13 193 345.9, which is incorporated by reference into the present patent application.

According to another alternative embodiment, the glass has a composition that comprises, in a content expressed in percentages by total weight of glass:

| | |
|---|---|
| Total iron (expressed in the form of Fe₂O₃) | 0.002-0.06%; | and one of the following components:
manganese (expressed in the form of MnO), in a content ranging from 0.01 to 1% by weight;
antimony (expressed in the form of Sb₂O₃), in a content ranging from 0.01 to 1% by weight;
arsenic (expressed in the form of As₂O₃), in a content ranging from 0.01 to 1% by weight;
or
copper (expressed in the form of CuO), in a content ranging from 0.0002 to 0.1% by weight.

Such compositions are described in European patent application no. 14 167 942.3, which is incorporated by reference into the present patent application.

According to yet another alternative embodiment, the at least first glass sheet has a composition that comprises, in a content expressed in percentages by total weight of glass:

| | |
|---|---|
| Total iron (expressed in the form of $Fe_2O_3$) | 0.002-0.04%; | and at least two components from chromium, selenium, copper, cerium, manganese and antimony; the chromium (expressed in the form of $Cr_2O_3$) being in a maximum content of 0.02% by weight; the selenium (expressed in the form of Se) being in a maximum content of 0.08% by weight; the copper (expressed in the form of CuO) being in a maximum content of 0.04% by weight; the cerium (expressed in the form of $CeO_2$) being in a maximum content of 0.8% by weight; the manganese (expressed in the form of MnO) being in a maximum content of 1.6% by weight; the antimony (expressed in the form of $Sb_2O_3$) being in a maximum content of 0.8% by weight; said composition respecting the formula:

$A \leq [10.02*(Cr_2O_3/Fe_2O_3)+4*(Se/Fe_2O_3)+2.73*(CuO/Fe_2O_3)+0.7*(CeO_2/Fe_2O_3)+0.23*(MnO/Fe_2O_3)+0.11*(Sb_2O_3/Fe_2O_3)]$; A being equal to 0.30.

Such compositions are described in European patent application no. 14 177 487.7, which is incorporated by reference into the present patent application.

According to one advantageous embodiment of the invention, the composition of the glass sheet has a redox of less than 15%. Preferably, the redox is less than 10%, or else less than 5% or even less than 3%.

The degree of oxidation of a glass is given by its redox, defined as the ratio by weight of $Fe^{2+}$ atoms to the total weight of iron atoms present in the glass, $Fe^{2+}$/total Fe.

The infrared-reflecting layer according to the invention may preferably be characterized by a light transmission $TL_C$ such that $L_C \geq 1.35*TIR_C$, $TL_C \geq 1.4*TIR_C$, or $TL_C \geq 1.5*TIR_C$, more preferably such that $TL_C \geq 1.75*TIR_C$, $TL_C \geq 1.9*TIR_C$, or $TL_C \geq 1.95*TIR_C$, and even more preferably $TL_C \geq 2*TIR_C$.

The layer may advantageously be characterized by an infrared reflection RIRC higher than 0.5*(1-AIRC) or higher than 0.6*(1-AIRC), or even more preferably higher than 0.76*(1-AIRC) or higher than 0.86*(1-AIRC) or higher than 0.9*(1-AIRC) or higher than 0.95*(1-AIRC) or higher than 0.96*(1-AIRC) or higher than 0.97*(1-AIRC) or higher than 0.98*(1-AIRC) or higher than 0.99*(1-AIRC).

In the range $RIR_C > 0.5*(1-AIR_C)$ and $RIR_C \leq 0.76*(1-AIR_C)$, the solar factor is not necessarily decreased in all circumstances with respect to the situation in which a substrate made of glass of the prior art of same $TL_V$ is used. However, this range remains useful in situations in which the differences in temperature and/or airflow are favorable to a transfer of heat to the interior of the building or vehicle.

In the range $RIR_C > 0.76*(1-AIR_C)$, the solar factor is lower than when a substrate made of glass of the prior art of same $TL_V$ is used, thus decreasing the energy transmitted to the interior and increasing the selectivity of the glazing.

In these two ranges, the other advantages according to the invention are present, such as the limitation of heating of the glazing, the varied esthetics and colors, the attenuated exterior light reflection, the correction of the color in exterior reflection, and/or the lesser angular dependence of the color in reflection.

Alternatively, it may be advantageous to use in combination with the glass according to the invention, a layer having a $TIR_C$ lower than 50, 40, 35, 30, 25, 20, 15, 10, 5, 4, 3, 2 or 1%.

Advantageously the infrared-reflecting layer used for these applications is a multilayer stack comprising n functional layers based on a material that reflects infrared radiation, with $n \geq 1$, and n+1 dielectric coatings such that each functional layer is flanked by dielectric coatings.

The functional layers, forming part of the infrared-reflecting layers, are advantageously formed from noble metal. They may be based on silver, gold, palladium, platinum or a mixture or alloy thereof, but also based on copper or aluminum, alone, alloyed or in an alloy with one or more noble metals. Preferably, all the functional layers are silver-based. This is a noble metal that has a very high efficacy of reflection of infrared radiation. It is easily implemented in a magnetron device and its cost price is not prohibitive, above all with regard to its efficacy. Advantageously, the silver is doped with a few percent of palladium, aluminum or copper, for example in an amount of 1 to 10% by mass, or it is possible to use a silver alloy.

The transparent dielectric coatings forming part of the infrared-reflecting layers are well known in the field of layers deposited by cathode sputtering. There are many suitable materials and there is no reason to give a complete list thereof here. They are in general metal oxides, oxynitrides or nitrides. Among the most common, mention may be made by way of example of $SiO_2$, $TiO_2$, $SnO_2$, ZnO, ZnAlOx, $Si_3N_4$, AlN, $Al_2O_3$, $ZrO_2$, $Nb_2O_5$, $YO_x$, $TiZrYO_x$, $TiNbO_x$, $HfO_x$, $MgO_x$, $TaO_x$, $CrO_x$ and $Bi_2O_3$, and mixtures thereof. Mention may also be made of the following materials: AZO, ZTO, GZO, $NiCrO_x$, TXO, ZSO, TZO, TNO, TZSO, TZAO and TZAYO. The expression AZO refers to a zinc oxide doped with aluminum or to a mixed zinc and aluminum oxide, preferably obtained from a ceramic target formed by the oxide to be deposited, sputtered either under a neutral or slightly oxidizing atmosphere. Likewise, the expressions ZTO or GZO respectively refer to mixed titanium and zinc or zinc and gallium oxides, obtained from ceramic targets, either under a neutral or slightly oxidizing atmosphere. The expression TXO refers to titanium oxide obtained from a ceramic titanium-oxide target. The expression ZSO refers to a mixed zinc-tin oxide obtained either from a metal target of the alloy deposited under oxidizing atmosphere or from a ceramic target of the corresponding oxide, either under a neutral or slightly oxidizing atmosphere. The expressions TZO, TNO, TZSO, TZAO or TZAYO respectively refer to mixed titanium-zirconium, titanium-niobium, titanium-zirconium-tin, titanium-zirconium-aluminum or titanium-zirconium-aluminum-yttrium oxides obtained from ceramic targets, either under a neutral or slightly oxidizing atmosphere. All the aforementioned materials may be used to form the dielectric coatings used in the present invention.

Preferably, the dielectric coating placed under one or under each functional layer comprises, in direct contact with the one or more functional layers, a layer based on a zinc oxide, optionally doped for example with aluminum or gallium, or alloyed with tin oxide. Zinc oxide may have a particularly favorable effect on the stability and resistance to corrosion of the functional layer, in particular when it is a question of silver. It is also favorable to the improvement of the electrical conductability of a silver-based layer, and therefore to the obtainment of a low emissivity.

The various layers of the stack are, for example, deposited by low-pressure magnetron cathode sputtering, in a well-known magnetron device. The present invention is however not limited to this particular layer-deposition process.

According to one particular embodiment of the invention, these sets of layers may be placed either on a carrier sheet, in particular of PET, inserted in the laminate, or by direct application to the glass sheet. In both cases, this infrared-reflecting means is located in the laminate upstream of the functional film with respect to the sun, thus improving the protection of this film.

According to one preferred embodiment of the invention, the laminated glazing according to the invention preferably comprises a functional film sandwiched between a first and a second glass sheet, the layer reflecting the infrared radiation then being placed on face 2 i.e. on the internal face of the first glass sheet that is mounted on the vehicle or building and that makes contact with the exterior environment. In this case, at least the first glass sheet, which is placed on the exterior side, has the aforementioned properties. However, the second glass sheet may also have the properties described above. The glass sheets may be of identical or different compositions.

According to another embodiment of the invention, the laminated glazing may be a triple glazing. In this case, the functional film is sandwiched between a first sheet and a second sheet of glass and a third sheet is placed on the side of the second glass sheet. In this case, at least the first glass sheet, which is placed on the exterior side, has the aforementioned properties. However, the second or even the third glass sheet may also have the properties described above. The glass sheets may be of identical or different compositions.

According to the invention, an assembly comprising a single glass sheet may also be envisioned. In this case, the glass sheet has the properties described above.

The laminated glazing is thus positioned such that, when it is mounted on a building, the solar radiation first strikes the coated glass sheet on the side devoid of layer, then the infrared-reflecting layer, then the second glass sheet, and then optionally the third if it is a question of a triple glazing. The infrared-reflecting layer is therefore, according to the convention generally used, in position 2. It is in this position that the solar protection is most effective.

According to a preferred embodiment of the invention, the functional film can be detrimentally affected at a high temperature. For example, such a film comprises liquid crystals dispersed in a polymer (PDLC) or also particles dispersed in suspension in a polymer (SPD) or even an electrochromic layer, etc.

High temperature is understood to mean temperatures of greater than 60° C. and preferably temperatures of greater than 80° C. The functional film subjected in a prolonged manner to such temperatures deteriorates. It is thus necessary to greatly reduce, indeed even eliminate, the absorption of infrared radiation by the glass sheet which will be placed on the exterior side of the vehicle and to maximize the reflection of infrared by the glass sheet comprising the infrared-reflecting means according to the invention. Specifically, this will decrease the direct transfer of infrared to the functional film and the reemission of heat by the glass comprising the infrared-reflecting means toward the functional film. According to the invention, the at least one thermoplastic interlayer can be of any material known in the art capable of forming a laminate. It can be an ethylene/vinyl acetate copolymer, polyurethane, polycarbonate, polyvinyl butyral, polyvinyl chloride or a copolymer of ethylene and of methacrylic acid. According to a preferred embodiment of the invention, the thermoplastic interlayer comprising a zone that is opaque to visible wavelength radiation is a sheet of polyvinyl butyral (PVB) or of ethylene/vinyl acetate (EVA). It is generally available in a thickness of between 0.38 and 1.1 mm but most often of 0.76 mm.

According to one particular embodiment of the invention, the thermoplastic interlayer is a colored interlayer.

The insertion of the functional film into the laminated glazing is preferably facilitated by the installation of a housing put into at least one interlayer. Thus, advantageously, the laminated glazing additionally comprises a second thermoplastic interlayer framing the functional film. Preferably, the second thermoplastic interlayer is preferably a sheet of polyvinyl butyral (PVB). The functional film then has a smaller size than that of the glass sheets between which the film will be laminated. The functional film is then placed in a region precut from the second thermoplastic interlayer so as to promote its lamination between the two glass sheets and to prevent the formation of bubbles in the laminated glazing.

According to a specific implementation of the invention, the first and second glass sheets are laminated by virtue of at least three thermoplastic interlayers.

Advantageously, additional thermoplastic interlayers can be positioned between the functional film and the glass sheets.

Such a design using at least three thermoplastic interlayers, including one framing the functional film, can be particularly advantageous in laminating an electrically powered functional film, the thickness of which is greater than approximately fifty microns.

According to a preferred embodiment of the invention, the functional film is placed at a certain distance from the edge of the laminated glazing and in particular from the "edge deletion" zone. This minimum distance, which depends on the length of the "edge deletion" zone, makes it possible to dissipate the heat and thus to protect the functional film.

As alternative to the metal layers on the base described above, the layer reflecting infrared radiation can comprise a plurality of nonmetal layers, so that it operates as a band-pass filter (the band being centered on the near infrared region of the electromagnetic spectrum).

Thus, during the use as a motor-vehicle glazing (this is also valid for a glazing intended to be mounted in a building), the laminated glazing according to the invention may be described as comprising at least one external glass sheet having an infrared reflection $RIR_V$ such that $RIR_V \geq 1.087 * TL_V$, $TL_V$ being the light transmission of the glass sheet and an internal glass sheet, and one infrared-reflecting means provided between the external glass sheet of the laminated glazing and the functional film characterized by a light transmission $TL_C$ such that $TL_C \geq 1.3 * TIR_C$, $TIR_C$ being the infrared transmission of the means for reflecting the infrared radiation. The use of this glazing allows the amount of infrared radiation that would otherwise be incident on the functional film and deteriorated to be decreased.

Furthermore, the components of the functional films can be degraded by excessive exposure to UV radiation. The choice of the interlayers makes it possible to considerably restrict this exposure. This is the case in particular of the use of PVB interlayers, which by nature screen out UV radiation, allowing only a very small proportion of the latter to pass. For PVB films with a thickness of 0.38 mm, more than 95% of the UV radiation is suppressed. This proportion can exceed 99%. Polymers based on ethylene/vinyl acetate (EVA) are also proposed which include components conferring on them a very low transmission of UV radiation.

Advantageously, the at least one thermoplastic interlayer and in particular the nonopaque zone is a thermoplastic interlayer which screens out UV radiation, also known as "UV-cut".

In the automotive field, the presence of a glazed roof modifies the conditions of thermal comfort for the occupants of the vehicle. Although heating when the vehicle is exposed to the sun leads to the conditions indicated above, for the passengers the presence of glazed roofs can also lead to what is described as a "cold shoulder" feeling when the exterior temperature is lower than comfortable ambient temperatures. This feeling is caused by a loss of heat from the passenger compartment, by the emission of far infrared radiation.

In order to minimize the loss of heat and the transfer by radiation of the energy absorbed in the assembly to the passenger compartment, low-E layers (low-emissivity layers) may be provided on face 4 of the glazing. The layers in question act as a filter which selectively reflects the far infrared rays emitted from the passenger compartment, without forming a significant obstacle to the transmission of the rays of the visible region from the exterior toward the interior.

The presence of thin layers in position 4 is chosen despite the fact that, in this position, the layers are not protected from detrimental changes, in particular detrimental mechanical changes. It is possible to choose low-e layers which offer a sufficient mechanical strength and chemical resistance.

Advantageously, in view of the importance of having available coatings of good mechanical strength, "hard" layers, such as those produced by techniques of pyrolytic, CVD or PECVD type, are chosen. However, low-e systems can also be prepared by vacuum cathode sputtering techniques, provided that these systems are protected by layers which are sufficiently resistant.

According to the invention, it is preferred to use a system of low-e layers, the emissivity of which is less than 0.3 and preferably less than 0.2 and particularly preferably less than 0.1.

The commonest pyrolytic low-e systems comprise a layer of doped tin oxide deposited on a first layer having the role of neutralizing the color in reflection. The layer in contact with the glass is ordinarily a layer of silica or silicon oxycarbide, optionally modified by additives. Tin oxide layers, compared with the layers of the systems deposited by cathode sputtering, are relatively thick, more than 200 nm and for some more than 450 nm in thickness. These thick layers are sufficiently resistant to withstand exposure to mechanical and/or chemical ordeals.

The functional film according to the invention is electrically powered. It is necessarily connected to the general electrical power supply system of the vehicle starting from the edges of the glazing. The connecting electrical lines are not normally transparent. In order not to disturb the transparency, even limited, of the glazing, it is necessary to conceal these lines in the peripheral zones of the glazing, which comprise, according to one implementation of the invention, an opaque zone formed by an enamel intended in particular to conceal the irregular marks of gluing of the glazing to the body.

The control of the functional film can comprise simple switches or also sensors placed between the functional film and the second glass sheet or on the face 4 of the laminated glazing. If it is desired to position a switch on the glazed roof itself, it is desirable for it not to obstruct the transparency, the reason for the choice of glazed roofs.

According to a preferred embodiment of the invention, the functional film makes it possible to vary the light transmission of the glazing incorporating the film.

The choice of the LC (or PDLC), SPD, electrochromic, etc. films in laminated roofs makes it possible to satisfy the need for the private nature and the absence of glare.

When the LC film is subjected to the electric field in the active mode, the degree of scattering, in a known way, can be adjusted as a function of the electric field applied. The orientation of the crystals is directly dependent on this field. The increase in the field remains limited to what the films can withstand without risk of breakdown, corresponding to a short circuit between the electrodes which cover the functional material composed essentially of polymer containing the liquid crystals. The voltage which can be withstood can depend in part on the thickness of the film. For the reasons indicated above, this thickness is limited. Under these conditions, the voltage which can be withstood for the normal films is of the order of 220 V.

For the composition of the roofs, it is preferable to limit the light entering the passenger compartment. The light can be relatively low without frustrating the wishes of the users. The choice of this limitation of the light flux, transmitted or scattered, is also due to the fact that it results in the limitation of the penetration of the heat. While the infrared rays are a major vector of the energy entering the passenger compartment, another very important part accompanies the radiation in the visible region. It is thus necessary, in order to control the energy flux, to substantially reduce the part of the visible radiation which crosses the glazing.

Advantageously, the glazings according to the invention are made up so that the light entering by transmission and scattering in the activated state of the LC film is not greater than 50% of the incident light and preferably less than 40%, indeed even 30%. This proportion can be much smaller. Nevertheless, the glazings according to the invention advantageously exhibit an overall degree of transmission and scattering in the activated state of the LC film which is not less than 5% and preferably not less than 10%.

The use of a glass sheet according to the invention, in particular of low TLv, is particularly advantageous in order to limit light transmission while guaranteeing weak heating of the functional film and a pleasant exterior esthetic (low light reflection).

Thus, colored thermoplastic interlayers can be superimposed so as to obtain a specific color or specific optical conditions.

An SPD can also be chosen so as to satisfy the requirement for the private nature and for the absence of glare. An SPD is a film comprising a plurality of particles in suspension in a liquid suspending medium, which are held in a polymer medium.

The film can switch between a dark state (in the absence of voltage is applied) and a highly transparent state (when a voltage is applied).

The relative degree of alignment between the particles is determined by the alternating voltage applied, so that a device based on SPDs exhibits a variable optical transmission when a variable voltage is applied.

The SPD film in a laminated glazing structure can represent all or a portion of an intermediate layer between the two glass sheets.

According to another particular embodiment of the invention, the functional film according to the invention is an electrochromic, photochromic or even thermochromic film.

According to a specific embodiment of the invention, the functional film according to the invention can comprise light-emitting diodes. There exist numerous light-emitting diodes known in the state of the art which can be used in accordance with the present invention.

For a better comprehension, the present invention will now be described in more detail by way of nonlimiting example, with reference to FIG. 1 which shows a schematic plane view of a known glazing 10 of the prior art comprising an SPD film stratified between 2 glass sheets.

FIG. 1 shows a laminated glazing according to the invention, in the form of a glazed roof for a motor vehicle 10, comprising a functional film in the form of a film 12 containing suspended dispersed particles, which film is fitted inside the laminated structure. FIG. 1 does not show the curvatures of the sheets, for the sake of clarity. In practice, roofs, whether or not they are glazed, exhibit curvatures which are ordinarily more accentuated at the edges in the place where they join with the body for a fit chosen for its design, the aerodynamics and the flush appearance corresponding to a good surface continuity between the contiguous elements.

The functional film is an SPD film containing suspended dispersed particles that are sensitive to the application of the electric voltage. This laminated structure additionally comprises a sensor sensitive to the application of the electric voltage so as to activate the SPD film (not shown), it being possible for such a sensor to be placed between the SPD and the second glass sheet.

The film 12 containing suspended dispersed particles (SPD film) is represented as being positioned close to the edges of the glass sheets 11 and 16 of the glazing 10 but they might be positioned anywhere inside the glazing, for example at the center. However, in order to protect the SPD film inside the laminated glazing, it is preferable for the edges of the film not to reach the edges of the glass sheets 11 and 16.

The SPD film is "framed" by a PVB frame 17 (corresponding to the second thermoplastic interlayer described above) and is laminated between two thermoplastic interlayers 17 and 18 (respectively corresponding to the first and third thermoplastic interlayers); this assembly is itself laminated between an external glass sheet ii and an external glass sheet 16. The thermoplastic interlayer 18 is added so as to ensure sufficient adhesion between the SPD film 12 and the exterior glass sheet 16. It is known to use a design in which a "frame" frames the functional film, itself laminated between two thermoplastic interlayers, in order to laminate a functional film within a glazing. According to a specific embodiment of the invention and as illustrated by FIG. 1, the thermoplastic interlayers 17 and 18 are made of PVB but, of course, they can be in any other material capable of making possible the lamination of the functional film between two glass sheets. The thermoplastic interlayers 17 and 18 are coextensive with the glass sheets 11 and 16. The SPD film exhibits a thickness of 0.38 mm.

Around the periphery of the glazed roof for a motor vehicle 10 is positioned, on faces 2 and 4, an occultation strip 101 and 102, more specifically an enamel layer, the role of which is, on the one hand, to conceal and protect the tightness material (not represented) which is used to attach the window in a vehicle (not represented) and, on the other hand, to conceal the electrical connections (busbars, and the like) which provide electrical energy to the polymer dispersed liquid crystal film 12. The infrared-reflecting layer 13, which is a silver metal layer, allows the infrared radiation 104 originating from the exterior (sun) and directed in the direction of the SPD film to be reflected. According to one particular embodiment of the invention.

The glass sheets 11 and 16 such as illustrated in FIG. 1 are made of soda-lime-silica glasses and respectively of 1.6 mm and 2.6 mm thickness.

By way of example, particular embodiments of the invention will now be described, with reference to examples 1 to 18 according to the invention and to comparative examples C1-C24 not according to the invention.

The main features of the glasses used in the examples and comparative examples are given in table I. Table II for its part describes infrared-reflecting layers according to the invention, respecting the relationship $TL_C \geq 1.3 * TIR_C$, whereas table III gives an example (said to be comparative) of a selective infrared-reflective layer not respecting the relationship $TL_C \geq 1.3 * TIR_C$.

In tables II and III,

ZSO5 represents a zinc-tin mixed oxide in which the proportion of zinc-tin is close to 50-50% by weight $(Zn_2Sn_2O_4)$, SiN represents a silicon nitride, TZO represents a titanium-zirconium mixed oxide, in which the proportion of titanium oxide and zirconium oxide is close to 65-35% by weight.

TABLE I

| Type of glass | $RIR_{V (ISO9050)}$ | $TL_{V (C,2)}$ | a* (D,10) | b* (D,10) |
|---|---|---|---|---|
| comp-clear | 76.8 | 89.7 | −0.9 | 0.2 |
| comp-extraclear | 95.4 | 91.5 | −0.1 | 0.1 |
| inv-clear | 99.2 | 89.9 | −0.9 | 0.6 |
| comp-green | 17.7 | 78.5 | −6.1 | 1.2 |
| inv-green | 97.1 | 75.5 | −5.4 | 0.4 |
| comp-dark green | 11 | 72.7 | −8.3 | 2 |
| inv-dark green | 96.8 | 71.1 | −7.3 | 1.4 |
| comp-green 'privacy' | 5 | 34.3 | −16.6 | 0.4 |
| inv-green 'privacy' | 91 | 41 | −16.1 | −1.1 |
| inv-blue | 96 | 77.2 | −3 | −2.9 |
| comp-dark blue | 18.4 | 66.7 | −6.6 | −8.1 |
| inv-dark blue | 95.1 | 64.2 | −5.4 | −8.3 |
| comp-blue 'privacy' | 6.7 | 46.5 | −12.7 | −11.8 |
| inv-blue 'privacy' | 90.4 | 42 | −10.6 | −12.2 |
| comp-light gray | 35.7 | 70.1 | −1.1 | 0 |
| inv-light gray | 97.1 | 70.1 | 0 | 0 |
| comp-gray | 42.7 | 55.7 | 0.9 | −2.1 |
| inv-gray | 95.2 | 55.9 | −1.4 | −1.9 |
| comp-gray 'privacy' | 7.7 | 17.4 | −1 | −0.1 |
| inv-gray 'privacy' | 87.3 | 17.3 | 1.2 | −0.9 |
| comp-bronze | 45.9 | 61 | 2.8 | 4.4 |
| inv-bronze | 96.6 | 58 | 2.6 | 4.3 |

TABLE II

| A | RIRc > 0.86* (1-AIRc) | | | | ZSO5 | ZnO | Ag | Ti | ZSO5 | ZnO | Ag | Ti | ZSO5 | ZnO | Ag | Ti | ZSO5 | Ti |
|---|---|---|---|---|---|---|---|---|---|---|---|---|---|---|---|---|---|---|
| | | | | | 385 Å | 142 Å | 55 Å | | 745 Å | 146 Å | 60 Å | | 710 Å | 133 Å | 50 Å | | 290 Å | 50 Å |
| B | $TL_C$ | $TIR_C$ | $RIR_C$ | $AIR_C$ | ZSO5 | ZnO | Ag | Ti | ZSO5 | ZnO | Ag | Ti | ZSO5 | Ti | | | | |
| | 79.6 | 17.2 | 74.2 | 8.6 | 290 Å | 120 Å | 60 Å | | 950 Å | 94 Å | 53 Å | | 180 Å | 50 Å | | | | |
| C | $TL_C$ | $TIR_C$ | $RIR_C$ | $AIR_C$ | SiN | NiCr | Ag | NiCr | SiN | | | | | | | | | |
| | 25.7 | 9.9 | 61.1 | 29 | 588 Å | 36 Å | 165 Å | 67 Å | 500 Å | | | | | | | | | |

TABLE II-continued

| D | $TL_C$ | $TIR_C$ | $RIR_C$ | $AIR_C$ | TiO2 | ZnO | Ag | TiO2 | ZnO | TZO |
|---|---|---|---|---|---|---|---|---|---|---|
|  | 88.8 | 37.2 | 57 | 5.8 | 180 Å |  | 118 Å | 30 Å |  | 445 Å |

TABLE III

| Z | $TL_C$ | $TIR_C$ | $RIR_C$ | $AIR_C$ | SnO2 | TZO |
|---|---|---|---|---|---|---|
|  | 68.7 | 82.5 | 17.5 | 0 | 150 Å | 420 Å |

In the following tables, unless otherwise indicated, the measurements are given for laminated glazings comprising from the exterior a first glass-substrate coated (layer in position 2) of 6 mm thickness (except for the comparative examples C1, C2, C3, in which the thickness is 8 mm) with a PVB film of 0.76 mm thickness, and a second glass that is what is called "mid-iron" of 4 mm thickness. The properties in terms of light transmission (TL), light reflection (RL), solar factor (SF), selectivity (select=TL/SF) absorption (Abs), unless otherwise indicated, are given according to standard ISO9050:2003, under illuminance D, 2°. The L*, a*, b* colors are given according to the CIE Lab model defined in 1976 by the Commission internationale de l'éclairage (CIE—International Commission on Illumination), under illuminant D, 10°, in transmission (T) and in reflection (R). The absorption (Abs) is the energy absorption of the complete laminated glazing.

TABLE A

| ex. | Substrate | Layer | TL D2° | L* D10 T | a* D10 T | b* D10 T | RL D2° | L* D10 R | a* D10 R | b* D10 R | Abs | FS | Select TL/FS |
|---|---|---|---|---|---|---|---|---|---|---|---|---|---|
| 1 | inv-light gray | A | 48.2 | 74.8 | −0.5 | 2.9 | 7.4 | 32.6 | −2.1 | −0.3 | 70.2 | 30.4 | 1.6 |
| C1 | comp-light gray | A | 49 | 75.3 | −4.4 | 4.3 | 7.5 | 32.9 | −4.3 | 0.6 | 72.8 | 38.3 | 1.3 |
| 2 | inv-light gray | B | 52.9 | 77.6 | 0.2 | 2.4 | 7.3 | 32.5 | −3.2 | −1.5 | 58.8 | 41.6 | 1.3 |
| C2 | comp-light gray | B | 53.7 | 78.1 | −3.9 | 3.9 | 7.4 | 32.8 | −5.1 | −0.7 | 68.6 | 41.7 | 1.3 |
| 3 | inv-light gray | C | 16.6 | 47.6 | −2.1 | 3.9 | 19.1 | 50.8 | 0.9 | −5.4 | 68.8 | 24.8 | 0.7 |
| C3 | comp-light gray | C | 16.8 | 47.3 | −5 | 4.9 | 19.6 | 51.4 | −3.8 | −3.5 | 72.7 | 28.2 | 0.6 |
| 4 | inv-green | A | 53.8 | 78.2 | −7.4 | 3.4 | 8.3 | 34.5 | −5.5 | 0.3 | 68 | 31.5 | 1.7 |
| C4 | comp-green | A | 57.1 | 80.2 | −8.1 | 4.3 | 8.7 | 35.3 | −7.3 | 1.5 | 68.4 | 40.4 | 1.4 |
| 5 | inv-green | B | 59 | 81.2 | −6.8 | 2.9 | 8.1 | 34.3 | −6.8 | −1.1 | 56.8 | 42.5 | 1.4 |
| C5 | comp-green | B | 62.5 | 83.2 | −7.7 | 3.9 | 8.6 | 35.3 | −8.2 | −0.8 | 63.4 | 44.5 | 1.4 |
| 6 | inv-green | C | 18.5 | 50 | −7.1 | 4.4 | 22.9 | 55.1 | −7.1 | −5.1 | 64.7 | 25.0 | 0.7 |
| C6 | comp-green | C | 19.7 | 51.4 | −7.8 | 5 | 25.2 | 57.5 | −9.2 | −3.8 | 65.8 | 28.5 | 0.7 |
| 7 | inv-green | D | 60.3 | 82 | −9.3 | 0.2 | 9.2 | 36.2 | −0.9 | 4.9 | 45.6 | 51.5 | 1.2 |
| C7 | comp-green | D | 63.9 | 84 | −10.5 | 1.2 | 9.8 | 37.3 | −1.2 | 5.6 | 59.2 | 46.6 | 1.4 |
| 8 | inv-green 'privacy' | A | 22.5 | 54.3 | −18.5 | 1.6 | 5.1 | 27 | −2.2 | −0.7 | 84.9 | 23.1 | 1.0 |
| C8 | comp-green 'privacy' | A | 17.2 | 48.6 | −18.6 | 2.5 | 4.7 | 25.9 | −2.1 | 0 | 89 | 23.3 | 0.6 |
| 9 | inv-green 'privacy' | B | 24.6 | 56.5 | −18.4 | 1 | 5 | 26.8 | −2.9 | −0.4 | 76.4 | 31.4 | 0.8 |
| C9 | comp-green 'privacy' | B | 18.8 | 50.5 | −18.8 | 2.2 | 4.7 | 25.9 | −2.2 | −0.4 | 88.1 | 30.0 | 0.6 |
| 10 | inv-green 'privacy' | C | 7.7 | 33.3 | −14.3 | 2.7 | 7.8 | 33.6 | −7.4 | −2.7 | 85 | 23.8 | 0.3 |
| C10 | comp-green 'privacy' | C | 5.9 | 29.2 | −14.4 | 3 | 5.3 | 30.3 | −6.9 | −1 | 91.5 | 26.2 | 0.2 |
| 11 | inv-dark blue | A | 42.5 | 71.4 | −7.1 | −7.7 | 6.8 | 31.5 | −2.7 | −4.8 | 72.9 | 29.3 | 1.5 |
| C11 | comp-dark blue | A | 44.9 | 73.2 | −8.6 | −7.5 | 7.1 | 32.1 | −4.4 | −4.3 | 73.5 | 37.8 | 1.2 |
| 12 | inv-dark blue | B | 46.6 | 74.2 | −6.6 | −8.5 | 6.8 | 31.5 | −4.3 | −5.6 | 62 | 39.9 | 1.2 |
| C12 | comp-dark blue | B | 49.2 | 75.9 | −8.2 | −8.3 | 7 | 32.2 | −5.6 | −5.9 | 68.7 | 41.8 | 1.2 |
| 13 | inv-dark blue | C | 14.6 | 45.2 | −6.9 | −3.4 | 16.1 | 47.6 | −3.5 | −17.3 | 72.7 | 24.7 | 0.6 |
| C13 | comp-dark blue | C | 15.4 | 46.4 | −8.1 | −3.4 | 17.5 | 49.6 | −6.1 | −17.4 | 74.7 | 28.2 | 0.5 |
| 14 | inv-dark blue | D | 47.7 | 75 | −8.6 | −11.2 | 7.3 | 32.6 | −1.1 | −1.1 | 51.6 | 48.9 | 1.0 |
| C14 | comp-dark blue | D | 50.5 | 76.8 | −10.4 | −11.1 | 7.7 | 33.3 | −1.9 | −1.1 | 65 | 44.0 | 1.1 |
| 15 | inv-gray 'privacy' | A | 6.3 | 29.8 | 0.4 | 1 | 4.3 | 24.7 | 0.1 | −0.6 | 91.1 | 19.5 | 0.3 |
| C15 | comp-gray 'privacy' | A | 6.3 | 30 | −1.5 | 1.5 | 4.3 | 24.7 | −0.1 | −0.5 | 92.8 | 26.8 | 0.2 |
| 16 | inv-gray 'privacy' | B | 6.9 | 31.2 | 1 | 0.6 | 4.3 | 24.7 | 0 | −0.5 | 83.1 | 27.4 | 0.3 |
| C16 | comp-gray 'privacy' | B | 6.9 | 31.4 | −1.1 | 1.8 | 4.3 | 24.7 | −0.1 | −0.5 | 91.5 | 27.7 | 0.2 |
| 17 | inv-gray 'privacy' | C | 2.2 | 16 | −0.5 | 1.8 | 4.5 | 25.4 | 0.3 | −0.9 | 90.2 | 23.0 | 0.1 |
| C17 | comp-gray 'privacy' | C | 2.2 | 16.2 | −1.9 | 2.1 | 4.5 | 25.3 | −0.1 | −0.7 | 94.1 | 25.6 | 0.1 |
| 18 | inv-gray 'privacy' | D | 7 | 31.6 | 0.3 | −0.9 | 4.3 | 24.8 | 0.1 | −0.4 | 74.6 | 35.2 | 0.2 |
| C18 | comp-gray 'privacy' | D | 7.1 | 31.8 | −2.1 | −0.2 | 4.3 | 24.8 | 0 | −0.4 | 90.7 | 28.3 | 0.3 |

TABLE B

| ex. | Substrate | Layer | TL D2° | L* D10 T | a* D10 T | b* D10 T | LR D2° | L* D10 R | a* D10 R | b* D10 R | Abs | FS | Select TL/FS |
|---|---|---|---|---|---|---|---|---|---|---|---|---|---|
| C19 | inv-green | Z | 58.9 | 81.1 | −7 | 3.6 | 14.2 | 44.7 | −6.9 | −2.9 | 20.9 | 70.5 | 0.8 |
| C20 | comp-green | Z | 62.5 | 83.1 | −7.9 | 4.6 | 15.4 | 46.4 | −8.5 | −2 | 48.8 | 50.0 | 1.3 |
| C21 | inv-dark blue | Z | 46.5 | 74.1 | −6.8 | −7.9 | 10.5 | 39.3 | −3.9 | −11.6 | 28.9 | 67.6 | 0.7 |
| C22 | comp-dark blue | Z | 49.1 | 75.9 | −8.4 | −7.7 | 11.4 | 40.7 | −5.8 | −11.8 | 56.4 | 47.6 | 1.0 |
| C23 | inv-gray 'privacy' | Z | 6.9 | 31.2 | 1.2 | 0.9 | 4.4 | 25 | 0.1 | −0.7 | 56.1 | 53.0 | 0.1 |
| C24 | comp-gray 'privacy' | Z | 6.9 | 31.4 | −1.1 | 1.6 | 4.4 | 25 | −0.1 | −0.6 | 88.8 | 29.7 | 0.2 |

EXAMPLES 1 TO 18 AND COMPARATIVE EXAMPLES C1 TO C18

Various layers according to the invention have been combined with different glasses, certain of which, not according to the invention (referenced comp-), have an infrared reflection $RIR_V$ lower than 1.087 times their light transmission $TL_V$, and others, according to the invention (referenced inv-), have an infrared reflection $RIR_V$ higher than or equal to 1.087 times their light transmission $TL_V$. The simulated values of light reflection and transmission, of colors in transmission in reflection, solar factor, selectivity and absorption of the laminated glazing are given in table A.

These results show that the combined use of a glass having an infrared reflection such that $RIR_V \geq 1.087 * TL_V$ and a layer satisfying the relationship $TL_C \geq 1.3 * TIR_C$ provides, at equivalent TL, a decrease in the solar factor, or at the very least a similar or hardly increased solar factor, at the same time as a lesser absorption. These combinations may therefore advantageously be used to decrease the heating of the functional film.

Examples including the layers A, B or C show that the combined use of a glass having an infrared reflection such that $RIR_V \geq 1.087 * TL_V$ and a layer satisfying the relationship $TL_C \geq 0.76 * TIR_C$ provides, at equivalent TL, a decrease in the solar factor at the same time as a lesser absorption, under all circumstances.

The examples including the layer D furthermore show that the combined use of a glass having an infrared reflection such that $RIR_V \geq 1.087 * TL_V$ and a layer characterized by an infrared reflection $RIR_C$ in the range $RIR_C \geq 0.5*(1-AIR_C)$ and $RIR_C \leq 0.76*(1-AIR_C)$ provides, at equivalent TL, a slight increase in solar factor (of at most about 5%), which is acceptable in certain circumstances, but again with the benefit of a lesser absorption and therefore decreased heating.

COMPARATIVE EXAMPLES C19 TO C24

A layer not according to the invention was combined with various glasses, certain of which were not according to the invention (referenced comp-), and others of which were according to the invention (referenced inv-). The simulated values of light reflection and transmission, of colors in transmission and in reflection, solar factor, selectivity and absorption of the laminated glazing are given in table B.

These comparative examples show that the combined use of a glass having an infrared reflection such that $RIR_V \geq 1.087 * TL_V$ and a layer not respecting the relationship $TL_C \geq 1.3 * TIR_C$ provides, at equivalent TL, a clear increase in solar factor (of about 20%) and a clearly decreased selectivity, this not making them advantageous in the context of use thereof to protect the functional film against heating and heat.

According to one particular implementation of the invention, the first and optionally the second glass sheet may be a colored glass sheet that is highly absorbent in the visible wavelength range (low $TL_V$), but that still guarantees a $RIR_V \geq 1.087 * TL_V$, such that the light transmission is limited only by the effect of these two sheets for example to less than 50%, and in a configuration of this type preferably to less than 30%. The second glass sheet may however also be a prior-art colored glass sheet.

By way of example, a glazing for a motor vehicle and in particular a glazing for a glazed roof according to the invention may have the following structure from the exterior to the interior glass sheet of 2.1 mm thickness having an infrared reflection $RIR_V$ such that $RIR_V \geq 1.087 * TL_V$, $TL_V$ being the light transmission of the glass sheet, a silver layer by way of infrared-reflecting means having a light transmission $TL_C$ such that $TL_C \geq 1.3 * TIR_C$, $TIR_C$ being the infrared transmission of the means for reflecting the infrared radiation clear PVB sheet forming screen to UV of 0.76 mm gray PVB sheet of 0.38 mm SPD film (or PDLC film, or electrochromic film, etc. coupled to a means allowing it to be electrically powered)

a minimum of two thermoplastic interlayers including in particular the means for activation of the SPD film clear glass sheet of 30.15 mm, coated with a system of low-e layers composed, as indicated above, of a silica layer covered with a doped tin oxide layer an enamel occultation strip.

The SPD film is powered by AC current of 50 Hz and under a potential difference which rises to 110 V.

A laminated glazing according to the invention can be fitted into any window of a vehicle or even a building.

It can particularly and preferably be used as a motor vehicle glazed roof.

By way of example, the RE was measured on laminated glazings according to the prior art with various thicknesses and compared with a glazing according to the invention.

The glazing according to the prior art comprises the following stack: Extra-clear glass/triple silver layer (meeting the condition $TL_C \geq 1.3 * TIR_C$)/0.76 mmPVB/SPD/clear glass and a laminated glazing according to the invention comprising the following assembly: glass sheet having an infrared reflection $RIR_V$ such that $RIR_V \geq 1.087 * TL_V$, $TL_V$ being the light transmission of the glass sheet (=inv-clear the properties of which are summarized in table I))/triple silver layer (meeting the condition $TL_C \geq 1.3 * TIR_C$)0.76 mm PVB/SPD/clear glass.

| thickness. (mm) | type of glass | RE (%) | Delta (%) |
|---|---|---|---|
| 1.1 | extra-clear | 49.3 | 0.4 |
|  | inv-clear | 49.7 |  |
| 1.6 | extra-clear | 49.1 | 0.6 |
|  | inv-clear | 49.7 |  |
| 2.1 | extra-clear | 48.8 | 0.8 |
|  | inv-clear | 49.6 |  |
| 2.6 | extra-clear | 48.6 | 0.9 |
|  | inv-clear | 49.5 |  |
| 3.2 | extra-clear | 48.3 | 1.1 |
|  | inv-clear | 49.4 |  |

+3Ag + 0.76 Clear PVB + 50 mm clear glass

These measurements make it possible to infer a decrease in the heating of the glazing which tends to protect the functional film from heat because absorption and therefore heating is decreased.

Specifically, the example below shows an increase in the overall energy reflection (RE) when the laminated glazing meets the definition described above. These values correspond to a better removal of solar energy and therefore to a limitation of heating within the glazing. The example also shows that the effect is proportional to the thickness of the first glass.

Moreover, a laminated glazing according to the invention can be provided with an additional functionality, by inclusion of appropriate elements, such as a hydrophilic or hydrophobic coating on face 1 or face 4. For example, laminated glazings, as used as windshield or rear window of a motor vehicle, comprise numerous functionalities, such as: layer reflecting solar radiation, thus making it possible to lower the temperature of the dashboard and the ambient temperature in the passenger compartment, the interior rear-view mirror support, busbars making it possible to convey an electric current, a network of heating wires, an upper strip screening out solar radiation, having a possibly shaded coloring, a rain detector, and the like.

The invention claimed is:

1. A laminated glazing comprising:
   a. an external first glass sheet,
   b. an electrically powered functional film,
   c. an infrared-reflecting means placed between the first glass sheet and the functional film,
   d. at least one first thermoplastic interlayer placed between the means for reflecting infrared radiation and the functional film,
   e. an internal second glass sheet,
   wherein at least the external first sheet has an infrared reflection $RIR_V$ such that $RIR_V \geq 1.087*TL_V$, $TL_V$ being the light transmission of the glass sheet, and the infrared-reflecting means is characterized by a light transmission $TL_C$ such that $TL_C \geq 1.3*TIR_C$, $TIR_C$ being the infrared transmission of the means for reflecting infrared radiation.

2. The laminated glazing of claim 1, wherein at least the first glass sheet has an infrared reflection $RIR_V$ such that $RIR_V \geq 1.087*TL_V+5$.

3. The laminated glazing of claim 1, wherein at least the external first glass sheet has an infrared reflection $RIR_V$ such that $RIR_V \geq 0.510*TL_V+53$.

4. The laminated glazing of claim 1, wherein at least the first glass sheet comprises a composition that comprises, in an amount expressed in percentages by total weight of glass:

| | |
|---|---|
| Total iron (expressed in the form of $Fe_2O_3$) | 0.002-0.06%; |
| $Cr_2O_3$ | 0.0001-0.06%. |

5. The laminated glazing of claim 1, wherein at least the first glass sheet comprises a composition that comprises, in an amount expressed in percentages by total weight of glass:

| | |
|---|---|
| Total iron (expressed in the form of $Fe_2O_3$) | 0.002-0.06%; |
| $Cr_2O_3$ | 0.0015-1%; |
| Co | 0.0001-1%. |

6. The laminated glazing of claim 1, wherein at least the first glass sheet comprises a composition that comprises, in an amount expressed in percentages by total weight of glass:

| | |
|---|---|
| Total iron (expressed in the form of $Fe_2O_3$) | 0.02-1%; |
| $Cr_2O_3$ | 0.002-0.5%; |
| Co | 0.0001-0.5%. |

7. The laminated glazing of claim 1, wherein at least the first glass sheet comprises a composition that comprises, in an amount expressed in percentages by total weight of glass:

| | |
|---|---|
| Total iron (expressed in the form of $Fe_2O_3$) | 0.002-1%; |
| $Cr_2O_3$ | 0.001-0.5%; |
| Co | 0.0001-0.5%; |
| Se | 0.0003-0.5%. |

8. The laminated glazing of claim 1, wherein the infrared-reflecting means is an infrared-reflecting layer characterized by an infrared reflection $RIR_C$ such that $RIR_C > 0.5*(1-AIR_C)$.

9. The laminated glazing of claim 8, wherein the infrared-reflecting layer is characterized by an infrared reflection $RIR_C$ such that $RIR_C > 0.76*(1-AIR_C)$.

10. The laminated glazing of claim 8, wherein the infrared-reflecting layer is a multilayer stack comprising n functional layers based on a material that reflects infrared radiation, with $n \geq 1$, and n+1 dielectric coatings such that each functional layer is flanked by dielectric coatings.

11. The laminated glazing of claim 1, wherein the infrared-reflecting means is silver-based.

12. The laminated glazing of claim 1, wherein the functional film can be detrimentally affected at a high temperature greater than 60° C.

13. The laminated glazing of claim 1, wherein the at least one first thermoplastic interlayer occupies substantially all the area of the glazing.

14. The laminated glazing of claim 1, wherein the at least one first thermoplastic interlayer is a sheet of polyvinyl butyral or of ethylene-vinyl acetate.

15. The laminated glazing of claim 1, wherein the functional film is a film comprising liquid crystals or a film comprising particles dispersed in suspension or an electrochromic film.

16. The laminated glazing claim 1, wherein the glazing is a glazed roof suitable for a motor vehicle.

17. The laminated glazing of claim 1, wherein the glazing is installed in a building.

\* \* \* \* \*